Aug. 14, 1956  J. S. SENEY  2,759,115

SPEED AND SYNCHRONIZING CONTROL BY MAGNETIC CLUTCH

Filed Aug. 28, 1953

INVENTOR
JOHN S. SENEY

BY Charles A. McClure
ATTORNEY

2,759,115

SPEED AND SYNCHRONIZING CONTROL BY MAGNETIC CLUTCH

John S. Seney, Henrico County, Va., assignor to E. I. du Pont de Nemours and Company, Wilmington, Del., a corporation of Delaware Application August 28, 1953, Serial No. 377,066

9 Claims. (Cl. 310—95)

This invention relates to a system of electronic control, particularly for the control of motor rotation, as in the manufacture of synthetic fibers, where windup rate of yarn produced from an extruded fiber-forming material must be closely controlled and synchronized with the rate at which the material is extruded.

Difficulty in operating motors at constant or selected speed under varying loads has prompted development of a considerable number of control systems. However, the system described herein affords a unique combination of rapid and complete response with great stability. The invention is described below with emphasis upon application to the manufacture of synthetic fibers; it is also suitable for many other uses that impose similar requirements.

A primary object of this invention is maintenance of desired speed of motor rotation regardless of changes in load. Another object is controlled variation in yarn windup to counteract uncontrolled variation in rate of production of the yarn being wound up. A further object is combination of speed-regulating and speed-synchronizing circuits. Another object is utilization of a synchro generator as a stabilizing control element. Other objects of this invention will be apparent from the following description and the accompanying diagrams.

Figure 1:
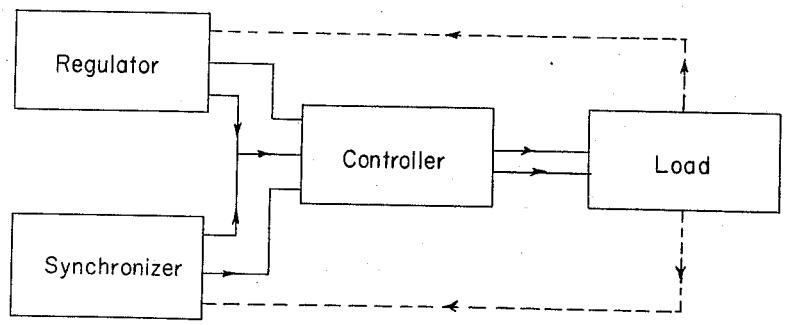
Figure 2:
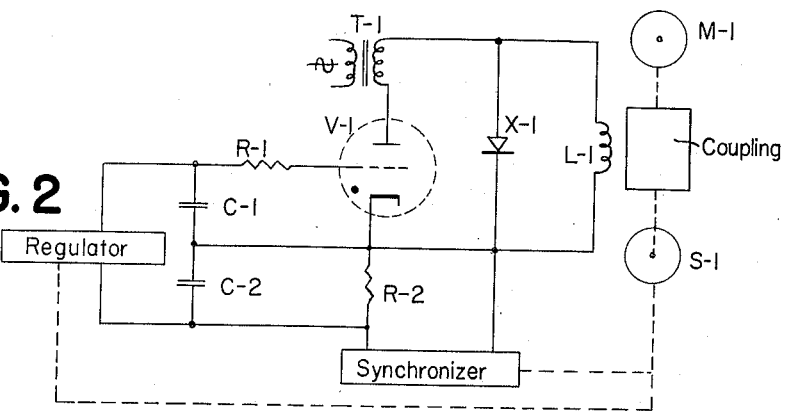
Figure 3:
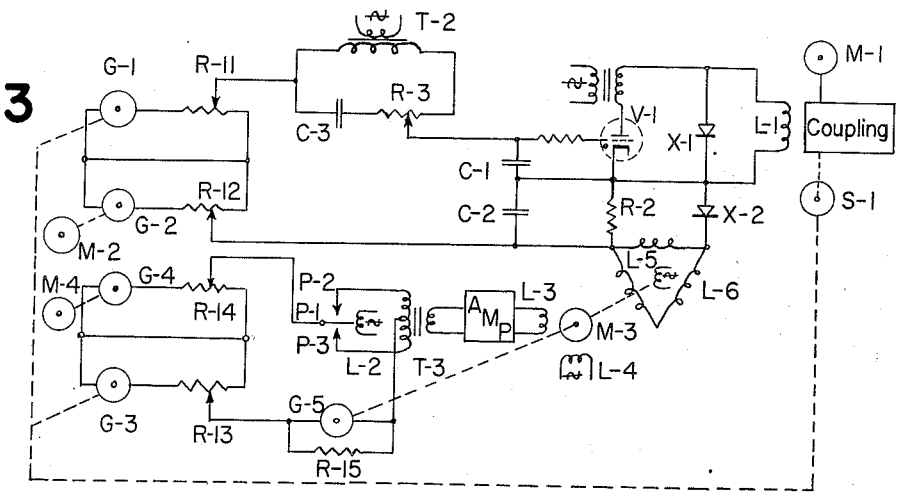

Figure 1 is a block diagram of apparatus of this invention. Figure 2 is a simplified schematic diagram of the controller and load components of Figure 1. Figure 3 is a simplified schematic diagram of components of Figure 1.

As indicated in Figure 1, four major components make up one form of apparatus useful in this invention. They are designated as "regulator," "synchronizer," "controller" and "load." The indicated electrical and mechanical interconnections provide two closed loops from the load, which is connected also to the controller component, separately to the regulator and synchronizer components, each of which in turn is connected to the controller.

Elements making up the controller, which directly affects the load coupling, appear in Figure 2. Connected across a source of alternating potential, which conveniently is a conventional power line, is the primary winding of transformer T-1. One end of the T-1 secondary connects to the plate of driving triode V-1, while the other end connects to crystal rectifier X-1. The cathode of V-1 and the other side of X-1 are tied together. Capacitor C-1 is connected between grid resistor R-1 and the cathode of V-1. Cathode-bias resistor R-2 and parallel capacitor C-2 are present in the cathode lead. Coil L-1, representing the actuating element of the load coupling, is connected across X-1 to receive the controller output. The input to L-1 determines the degree of coupling of drive motor M-1 to driven element or load S-1. The coupling may be simply a rotatable mechanism mounting L-1 on the motor shaft and an accompanying eddy-current disk on the load shaft rotation in proximity to each other so that the field of L-1 is effective to rotate the disc.

Mechanical connections shown as dashed lines on Figure 3, between the driven element and both the regulator and synchronizer are drives for tachometer generators in those two components. In the regulator, generator G-1 is driven by connection with S-1. Arranged in potential opposition to G-1 is generator G-2, whose output potential is unvarying. Their net output appears across resistors R-11 and R-12 in series, the junction of these two resistors being tied to one side of each generator. Leads from the potential divider made up by R-12 and R-11 connect to the junction of C-2 and R-2 and to the junction of T-2 and R-3, respectively, so as to apply the output from grid to cathode of V-1. The lead to the grid resistor is the slider of R-1, which is in series with capacitor C-3 across the secondary winding of transformer T-2. The primary of T-2 is supplied by the same source of alternating potential that supplies T-1, so a shift in phase of the grid-to-cathode alternation relative to the plate-to-cathode alternation is applied depending upon the setting of R-3.

In the synchronizer component, also shown in Figure 3, tachometer generator G-3 is connected to the driven element by suitable mechanical linkage. Generator G-4 is driven by motor M-4 at a speed subject to uncontrolled variations within a fairly narrow range, its average speed approximating the speed at which G-3 is driven. G-3 and G-4 are connected together in opposition with resistor R-13 across G-3 and resistor R-14 across G-4 so as to form a simple potential comparison network similar to that of the regulator. A lead from R-14 goes to reciprocable contact P-1 of an inverter gap, and a lead from R-13 connects to the center tap of the primary of transformer T-3 through resistor R-15. The winding terminates at contacts P-2 and P-3, between which P-1 oscillates at the instance of coil L-2, which is fed by the common alternating power source. The inverter output is coupled by T-3 into amplifier AMP that raises the signal level. Any output from the amplifier establishes an alternating magnetic field in output coil L-3, and coil L-4 establishes a periodically varying field as it is fed from the alternating power source; the resultant of the two fields orients two-phase motor M-3. Driven by M-3 is tachometer generator G-5, whose terminals connect with R-13 and to the center tap of the T-3 primary so as to oppose the input error signal. Resistor R-15 shunts G-5 so as to limit the feedback signal. Also driven by M-3 is rotor L-5 of a synchro generator, which may be a Selsyn transmitter, whose deltoid (or, alternatively, Y-shaped) stator is L-6. One junction of the stator coils is tied to the junction of R-2 and C-2, which separate it from the V-1 cathode. Another junction of the stator coils connects to the positive side of crystal rectifier X-2, whose other side is tied to the cathode of V-1.

Operation of the regulator is readily understood. Any change in the speed of the driven element from the desired speed alters the speed of G-1 altering its output and varying the direct potential applied from the cathode to the grid of V-1. This causes V-1, which preferably is a gas-filled tube of thyratron type, to conduct for a slightly different fraction of the half cycle during which its plate is positive with respect to its cathode. This change in rectified output to L-1 affects the load coupling in an opposing direction so as to counteract the original speed variation. The sensitivity of response is adjustable by setting R-3 so as to apply an alternating potential from grid to cathode of V-1 displaced in phase from the alternating potential applied from plate to cathode by T-1. The proper phase displacement for smooth and rapid speed regulation may be ascertained easily by varying R-3 throughout its range and observing the response of the system.

The synchronizer operates in a somewhat analogous manner. Tachometer generator G-3 is driven by mechanical connection with the driven element S-1, while similar generator G–4 is driven by motor M–4. Consistency between the speeds of S–1 and M–4 is established as follows. The unidirectional error output from R–13 and R–14 across these two generators is changed to an alternating error signal by the inverter elements. After sufficient amplification in a conventional phase-discriminating amplifier, the signal drives M–3 at a speed and in a direction indicative of the magnitude and the polarity of the original error signal. The degenerative feedback from G–5, as driven by M–3, is applied to the input error signal to prevent overshooting by M–3. Selsyn rotor L–5 is positioned by M–3 to induce in the tapped winding of stator L–6 a potential that is rectified by X–2 and applied across R–2 and C–2 in the V–1 cathode lead. Of course, the polarity is such that the resulting change in bias of V–1 affects its conduction period so as to oppose the discrepancy in the speeds of S–1 and M–4. Uncontrolled change in the speed of M–4 would give rise to a similar discrepancy that would be corrected similarly by the synchronizer.

The combined action of the regulator and synchronizer upon the speed of the driven element may be visualized readily. Assume, for the sake of example, that the speed of rotation of the drive motor drops for any reason, such as an increase in the requirement for power to actuate the driven element. This lowers the speed of rotation of both reference generators G–1 and G–3. In a time of the order of a millisecond or less, the change in bias furnished V–1 by the regulator increases the degree of load coupling to restore to S–1 a large fraction of the speed loss. Of course, this closer coupling itself increases the load on M–1, perhaps sufficiently to require further corrective action.

The regulator may be expected to allow some residual error because a change in the net output of G–1 and G–2 is necessary to alter the firing point of V–1. The extent of unresponsiveness of the regulator is masked by the complementary action of the synchronizer, as it continues to affect the controller until the load speed agrees with the speed of G–4, which is driven independently by M–4. This is essential not only to the elimination of the assumed error but also required to permit the load speed to follow uncontrolled changes in the speed of M–4. The outputs of both the regulator and the synchronizer are adjusted to zero by proper setting of the adjustable resistors in the comparison circuits when each of the driven elements is moving at the driven speed.

Returning to the original assumption of a drop in the load speed, which slows G–3 also, this provokes a net potential difference between G–3 and G–4. The inverted and amplified error changes the position of rotor L–5, and the output from stator L–6 is rectified and applied to vary the bias of V–1. This bias also is directed to increase the coupling to the load; however, owing to the inertia of the mechanical elements in the synchronizer, the corresponding corrective action is less rapid (usually of the order of tenths of a second) than that of the regulator. Being essentially a null system, the synchronizer applies a correcting potential so long as appreciable unbalance remains. Thus, the total corrective action is composed of a rapid response to large errors by the regulator, with its accompanying instability and relatively wide range of insensitivity at low error, and a positive elimination of small errors by the synchronizer, which has inherently slow response. The combination as described eliminates the undesirable features of each of these components while producing a cumulative corrective action.

Additional filtering elements and other refinements may be incorporated in the apparatus described without a departure from the inventive concept. Equivalents of the elements mentioned will come readily to the mind of one skilled in the art. No attempt is made to enumerate such variations in either this text or the diagrams.

As examples may be mentioned substitution of a regulated electronic potential supply for the source of constant unvarying potential (M–2 plus G–2) and use of any of a number of known magnetically actuated friction clutches in the load coupling to replace the eddy-current device or even assimilation of L–1 as an armature or field coil in M–1 itself. Of course, the simple potential comparison circuits may be elaborated into bridge or similar form. Timing and resetting controls may be added, or uncorrected variation may be introduced, as by a cam or eccentric driven by time or by load rotation to vary R–14 or other element independently, as may be desirable in particular applications of the system. Although the apparatus may be simplified somewhat over the form depicted, as by combining two or more of the circuit elements or otherwise, the extent of description used here presents an optimum of detail.

When the system described is used in the fiber manufacturing industry, M–1 may be a suitably actuated large motor, and S–1 customarily is an element of a system of yarn windup, such as a bobbin drive shaft. The extrusion rate of fiber-forming material is determined by the rotation of M–4, which constantly drives one or more pumps to force the material through spinnerets into the form of yarn that then is wound up. Thus, windup speed is synchronized with extrusion rate irrespective of changes in load or variation in pump speed. Because of possible ensuing non-linear response of wound yarn to additional processing steps, an uncorrected non-linear deviation of windup speed from pump speed is often advantageous. It may be introduced by varying R–14, as mentioned above, by analogy with the procedure described in Patent 2,676,495, which issued from my patent application, Serial No. 166,750, filed June 7, 1950. Many related arts involving formation or processing of a long or continuous length of material present opportunities for the use of the system of this invention; the film, paper, and wire industries are only a few of these. When the present invention is applied to attain the objectives suggested, the advantages inherent in its use will be readily apparent.

What is claimed:

1. Apparatus comprising a driving element and an element driven thereby; a control circuit adapted to vary the force exerted by the driving element on the driven element by varying the conduction of a thermionic tube having an anode, a cathode and a control grid; a first circuit effective to bias the tube from grid to cathode according to any deviation in speed of the driven element from a predetermined speed; and a second circuit effective to bias the tube from grid to cathode according to any deviation in speed of the driven element from the speed of an independently driven element.

2. Apparatus according to claim 1 in which the first bias circuit includes a tachometer generator actuated by connection with the driven element and a generator having predetermined fixed output and the second bias circuit includes a tachometer generator actuated by connection with the driven element and another tachometer generator actuated by connection with the independently driven element.

3. Apparatus according to claim 2 in which the second bias circuit includes a synchro generator responsive to a signal derived from the difference in outputs between the tachometer generator actuated by connection with the driven element and the tachometer generator actuated by connection with the independently driven element.

4. Apparatus comprising means for creating a first unidirectional electrical potential whose magnitude is dependent upon the speed of a driven element, comparing this first potential with a predetermined fixed potential, and applying any difference in potential to actuate control means for the driven element, the control means including a gas-filled thermionic tube having a control grid; and means for creating a second unidirectional potential whose magnitude is dependent upon the speed of the same driven element, comparing this second potential with a unidirectional potential indicative of the speed of an independently driven element, and applying any difference in potential to actuate the same control means for the driven element.

5. Apparatus according to claim 4 in which the means acting upon difference between the second unidirectional potential and the unidirectional potential indicative of the speed of the independently driven element includes inverter and amplifier means effective to actuate the rotor of a synchro generator, one of whose stator windings is connected in series with a rectifying element to the grid of the tube.

6. In apparatus for controlling the speed of a driven element by varying conduction of a gas-filled thermionic tube to actuate driving means for the element, the improvement comprising a first bias circuit and a second bias circuit whose outputs are superimposed between the grid and the cathode of the driving tube, the first bias circuit comprising means for producing a unidirectional output potential indicative of the speed of the driven element relative to a predetermined fixed speed, and the second bias circuit comprising means for producing a unidirectional output potential indicative of the speed of the driven element relative to the speed of an independently driven element.

7. The apparatus improvement of claim 6 in which the second bias circuit includes two tachometer generators connected in potential opposition, one of the generators being connected to the driven element and the other of the generators being connected to an independently driven element, an inverter adapted to produce an alternating signal from the combined outputs of the two generators, and a synchro generator whose rotor position is determined from the inverted signal and one of those stator windings is connected to a rectifier between the grid and the cathode of the tube.

8. The apparatus of claim 1 in which the first circuit has an effective response time on the order of a hundred times as long as the effective response time of the second circuit.

9. Apparatus comprising a driving element, a driven element, a variable coupling between the driving and driven elements and actuated by the output of a rectification circuit; connected to the driven element, two generators, each responsive to the rate at which the driven element is driven and having electrical output indicative thereof; connected in opposition to the first of these generators a third generator having constant electrical output, and connected across the combined output of the first and third generators a comparison circuit whose output is applied to vary the conduction period of a gas-filled thermionic tube in the rectification circuit; connected in opposition to the second of the generators a fourth generator having independently controllable electrical output, and connected across the combined output of the second and fourth generators a potential comparison circuit whose output is applied to a suitable servo amplifier; and, positioned by the output from the servo amplifier, a synchro transmitter whose rectified output is applied to the gas-filled tube to affect its conduction, thereby affecting the output of the rectification circuit.

References Cited in the file of this patent

UNITED STATES PATENTS

| | | |
|---|---|---|
| 2,298,877 | Edwards et al. | Oct. 13, 1942 |
| 2,650,996 | Jaeschke | Sept. 1, 1953 |
| 2,676,495 | Seney | Apr. 27, 1954 |